March 3, 1964
R. D. MARX
3,123,088
TRUCK TANK BI-DIRECTIONAL VENTING VALVE MEANS
Original Filed Feb. 12, 1960
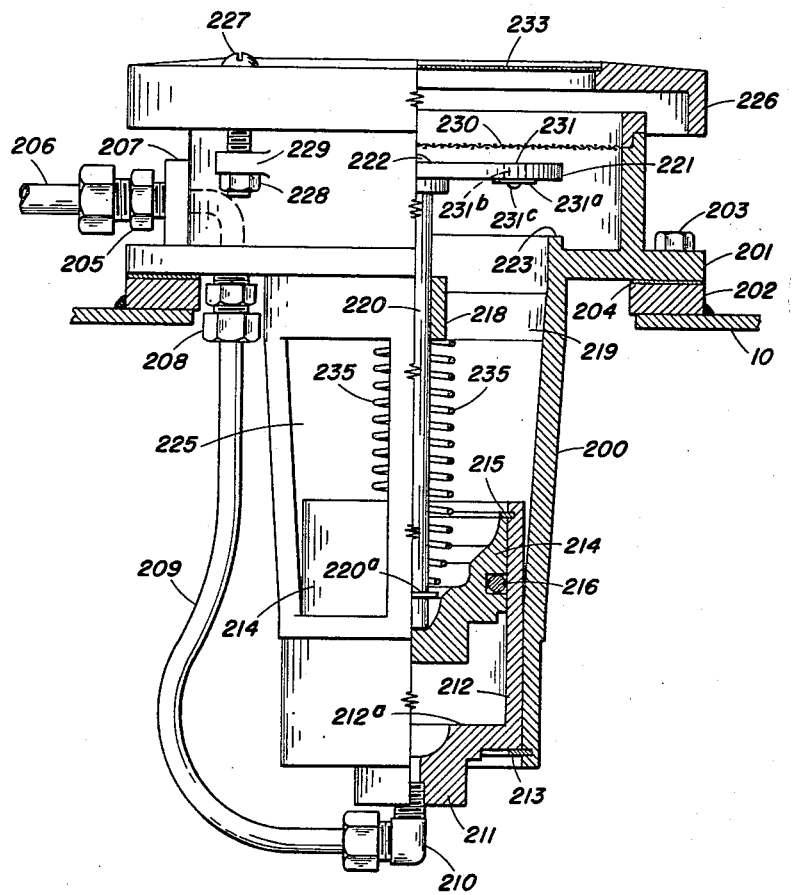
INVENTOR
Robert D. Marx
BY
Morgan, Finnegan, Durham & Pine
ATTORNEYS United States Patent Office 3,123,088
Patented Mar. 3, 1964

3,123,088
TRUCK TANK BI-DIRECTIONAL VENTING
VALVE MEANS
Robert D. Marx, 63 Jasper St., Valley Stream, N.Y.
Original application Feb. 12, 1960, Ser. No. 8,420. Divided and this application June 16, 1961, Ser. No. 117,648
4 Claims. (Cl. 137—73)

This invention relates to components of fluid storage and control systems and more particularly to venting arrangements for portable storage and transporting systems such as truck tanks.

Present systems for loading, carrying, and dispensing fluids, e.g. fuels, are generally adequate for their basic functions but have certain performance limitations which have taken on added significance as transportation time becomes of the essence. While the actual portal-to-portal transportation time is generally not dependent on the characteristics of the tank nor on the fluid control system, the unloading time is dependent on these factors and this unloading time has taken on considerable importance for certain users. In the case of the aircraft industry, for example, it is desirable that aircraft "downtime" be kept to an absolute minimum. A burden is accordingly placed on the refueling operation. The refueler must discharge its contents as rapidly as possible.

Similar rapid unloading rates are required in the case of cryogenic fluids such as are used for fueling missiles. Present refuelers are not adapted to properly carry this burden since their dispensing rates are unsatisfactorily low. Inherent design factors are the chief cause of this inadequacy, one factor being improper venting. This condition may also cause structural damage to the tank.

The invention seeks to overcome the aforementioned shortcomings and limitations, one object being the provision of improved tank venting means for providing improved dispensing rates and safer operation.

Another object of the invention is to provide improved cooperation means between venting and liquid valves.

A further object of the invention is to provide an improved vent valve having automatic pressure and vacuum relief as well as operator-controlled venting functions.

These and other objects and advantages of the invention will be set forth in part hereinafter and in part will be obvious herefrom, or may be learned by practice with the invention, the same being realized and attained by means of the instrumentalities and combinations pointed out in the appended claims.

Briefly and generally the invention comprises self-contained means for controlling a vent communicating with the interior of a trunk tank, said means including integral valve and valve control means releasably coupled together and arranged in novel juxtaposition in an apertured casing so that the valve is responsive to tank pressure conditions which effect said releasable coupling and to operator controls which affect the valve via said valve control means. The valve is so oriented and configured as to include integral vacuum relief means so that the valve is also responsive to vacuum conditions within the tank.

The invention thus consists of the novel parts, constructions, arrangements, combinations and improvements herein shown and described.

An exemplary embodiment of the invention will be described hereinafter and is illustrated in the drawing herein, which comprises an elevation view partly in section of a fluid-operated vent valve according to the invention.

As embodied, the valve according to the invention includes a casing 200 having a flange 201 which is secured by bolts 203 to a saddle 202. The latter is secured to shell 10 of a tank, as by welding. A sealing of the valve and saddle is afforded by gasket 204.

Installed in the upper section of casing 200 is fitting 205 to which is connected line 206. This line supplies control pressure to the valve via the path which includes fitting 205, a passageway in the casing 200, the lower end of the passageway including a fitting 208 threadably installed therein. The path thereafter includes line 209 connected to fitting 208 and a third fitting 210 connected at one end to line 209 and threaded at the other end into a port in boss 211 integral with a cylinder 212. The latter is installed in the base of casing 200 and is secured thereto by lock ring 213. Cylinder 212 is concentric with casing 200 while a piston 214 is concentric with the cylinder, being slidably disposed in the interior thereof. A retaining ring 215 disposed in the wall of cylinder 212 limits the upward travel of the piston and relieves strains on a valve stem 220 seated on the piston. An O ring 216 seals the piston with respect to the walls of the cylinder.

In the central region of casing 200 and concentric therewith is a boss 218 integral with the casing by virtue of struts 219. Slidably disposed in a bore in the boss 218 is the valve stem 220, one end of which is seated in the central bore of piston 214, the other end of which is secured to a valve head 221 by means of a screw 222. A spring 235, coaxial with stem 220 has one end thereof abutting the shoulder of boss 218 while its other end contacts retaining ring 220a on stem 220 such that the latter, and piston 214, are urged into their lowest positions where the piston seats on rim 212a of cylinder 212 and valve head 221 seats on rim 223 of casing 200 thus sealing the interior of the tank except for normal "breathing" actions. These latter conditions involve pressure relief and vacuum relief.

Vacuum relief involves the intake of air through three slotted vacuum relief vents 231 each of which includes a resilient blade 231a pinned at one end as by rivets 231c to the head 221 and oriented to seal the slotted aperture 231b in the valve head, except when vacuum conditions in the tank, e.g. 3 p.s.i. differential, overcome the resilient force in the blades to cause the vent to open. For pressure relief, valve head 221 leaves seat 223 under the direct influence of tank internal pressure, the stem 220 also leaving piston 214. Whether the valve head is to be controllably elevated by the application of hydraulic pressure to the base of cylinder 212, which causes the piston, valve stem and valve head to rise, or, is to be actuated directly by internal tank pressure to provide pressure relief as described above, communication between the interior of the tank and the atmosphere is afforded via slots 225 in casing 200, through the annular passageway defined by the casing and the valve and thence through the upper annular exit formed by the spacing between the casing and a cap 226 secured thereto by bolts 227 and nuts 228. These join the cap to lugs 229 on the casing. Included in this passageway is a screen 230 which functions both as a filter and to prevent back burning in event of a fire. Other features operative during a fire include blow-off disc 233 which is secured by readily fusible material such as solder or Wood's metal to cap 226. The valve is designed to be connected to a fused point of the hydraulic system. If this is not practical a separate fuse may be provided.

The illustrated valve has many significant features. Since it is fluid-operated and has a wide diameter cylinder it may be made to open (e.g. at 11 p.s.i.) before the associated compartment fuel valve (not shown) opens (e.g. at 40+p.s.i.) and to close after the latter closes thus affording optimum venting and providing high discharge rates. The possibilities of tank collapse are also eliminated. This valve in combination with a six inch internal valve, enables pumping rates in refueler trucks in excess of 700 g.p.m.

The valve also provides maximum safety features to minimize the effects of truck collisions, turn-over and fires and the pressure-vacuum relief arrangement eliminates the need for separate vacuum relief vents such as are employed in fill covers. Unlike prior art arrangements which require entry into the tank compartment for servicing (e.g. adjusting, installing and removing) the valve according to the invention may be serviced from outside the tank. Moreover, it may be used in a standard tank configuration or in an arrangement such as shown in applicant's copending application, Serial No. 8,420, filed February 12, 1960, for Fluid Transportation and Control Systems. When utilized in a tank, the valve need not be mounted in juxtaposition with the hydraulic operator and with the internal valve lift rod but rather can be installed at a remote point. This is particularly advantageous where the tank is mounted in an inclined position such that the liquid level leaves a clearance with respect to the top of the shell only in a region which is remote from the internal valve. The vent valve may be located in this free space region.

While only one embodiment has been shown, modifications thereof will occur to those skilled in the art. The invention is thus not limited to the specific mechanisms shown and described but departures may be made therefrom within the scope of the accompanying claims without departing from the principles of the invention and without sacrificing its chief advantages.

This application is a division of copending application Ser. No. 8,420, filed February 12, 1960, for Fluid Transportation and Control Systems.

What is claimed is:

1. A truck tank including venting means adapted to cooperate with an aperture in said tank to controllably and automatically vent the same and to be removable from the exterior of said tank comprising a casing mounted in said aperture, said casing having a first section adapted to clear said aperture in the vent of removal and comprising cylinder means, said cylinder means including a port for the admission of control fluid pressure, a pressure line connected to said port and routed out through said aperture, piston means slidably disposed in said cylinder means and adapted in response to said control pressure to undergo substantially rectilinear movement, valve means in said casing adapted to open and close said first section of said casing with respect to another section of said casing, said valve means including a vacuum relief vent having a valve responsive to vacuum conditions within said tank, an aperture in said first section communicating with the interior of said tank, discontinuous coupling means for coupling said valve means to said piston means whereby said valve means respond to said control pressure and to tank pressure, and cover means to provide protection, said cover means including a passageway communicating with said other section of said casing and the exterior of said tank.

2. A truck tank including venting means adapted to cooperate with an aperture in said tank to controllably and automatically vent the same comprising a generally cylindrical casing mounted in said aperture, said casing having a reduced diameter section comprising cylinder means, said cylinder means including a port for the admission of control fluid pressure, piston means slidably disposed in said cylinder means and adapted to respond to said control pressure, a valve in said casing adapted to open and close said reduced section of said casing with respect to an enlarged section of said casing which is exterior to said tank, the junction of said casing sections defining a valve seat, apertures in said reduced section communicating with the interior of said tank, said valve having a stem resiliently urged into contact with said piston means whereby said valve responds to said control pressure and to tank pressure, said valve including a plurality of vacuum apertures and respective closure means resiliently urged into closing relationship with respect to said apertures whereby said valve is also responsive to vacuum conditions within said tank, and a cover arranged over said enlarged section of said casing and displaced therefrom to define a passageway communicating with the exterior of said tank.

3. A truck tank including venting means adapted to cooperate with an aperture in said tank to controllably and automatically vent the same comprising a generally cylindrical casing mounted in said aperture, said casing having a reduced diameter section comprising cylinder means, said cylinder means including a port for the admission of control fluid pressure, piston means slidably disposed in said cylinder means and adapted to respond to said control pressure, a valve in said casing adapted to open and close said reduced section of said casing with respect to an enlarged section of said casing which is exterior to said tank, the junction of said casing sections defining a valve seat, apertures in said reduced section communicating with the interior of said tank, said valve having a stem resiliently urged into contact with said piston means whereby said valve responds to said control pressure and to tank pressure, said valve including a plurality of vacuum apertures and respective closure means resiliently urged into closing relationship with respect to said apertures whereby said valve is also responsive to vacuum conditions within said tank and a cover arranged over said enlarged section of said casing and displaced therefrom to define a passageway communicating with the exterior of said tank, said cover including a fire port and a disk, said disk being fusibly connected to said cover to close said port except when elevated temperatures are encountered, and in which said enlarged section includes a screen for fire protection and filtering.

4. A truck tank including venting means adapted to cooperate with an aperture in said tank to controllably and automatically vent the same comprising a generally cylindrical casing mounted in said aperture, said casing having a reduced diameter section comprising cylinder means, said cylinder means including a port for the admission of control fluid pressure, piston means slidably disposed in said cylinder means and adapted to respond to said control pressure, a valve in said casing adapted to open and close said reduced section of said casing with respect to an enlarged section of said casing which is exterior to said tank, the junction of said casing sections defining a valve seat, apertures in said reduced section communicating with the interior of said tank, a line connected to said cylinder port and to said enlarged section for coupling said control fluid pressure to said cylinder, said valve having a stem resiliently urged into contact with said piston means whereby said valve responds to said control pressure and to tank pressure, said valve including a plurality of vacuum apertures and respective closure means resiliently urged into closing relationship with respect to said apertures whereby said valve is also responsive to vacuum conditions within said tank, and a cover arranged over said enlarged section of said casing and displaced therefrom to define a passageway communicating with the exterior of said tank, said cover including a fire port and a disk, said disk being fusibly connected to said cover to close said port except when elevated temperatures are encountered, and in which said enlarged section includes a screen for fire protection and filtering.

References Cited in the file of this patent

UNITED STATES PATENTS

| | | |
|---|---|---|
| 960,986 | Moore | June 7, 1910 |
| 1,693,888 | Clark | Dec. 4, 1928 |
| 2,004,715 | Thwaits | June 11, 1935 |
| 2,730,126 | Jensen | Jan. 10, 1956 |
| 2,748,799 | Rath | June 5, 1956 |
| 2,821,991 | Marx | Feb. 4, 1958 |
| 2,904,074 | Towler | Sept. 15, 1959 |

FOREIGN PATENTS

| | | |
|---|---|---|
| 951,692 | Germany | Oct. 31, 1956 |